Figure 1:
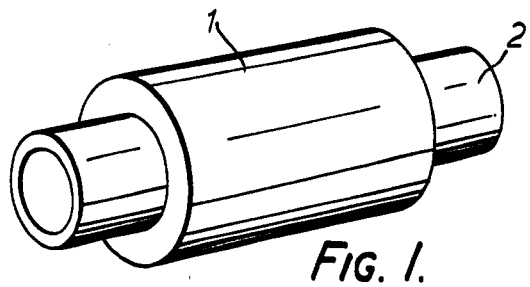

United States Patent [19]

Clabburn

[11] 4,149,911
[45] Apr. 17, 1979

[54] MEMORY METAL ARTICLE

[75] Inventor: Robin J. T. Clabburn, Atherton, England

[73] Assignee: Raychem Limited, London, England

[21] Appl. No.: 870,195

[22] Filed: Jan. 17, 1978

[30] Foreign Application Priority Data

Jan. 24, 1977 [GB] United Kingdom ............... 2834/77

[51] Int. Cl.² ........................... C21D 1/78; C22F 3/00
[52] U.S. Cl. ........................ 148/11.5 R; 148/11.5 C; 148/11.5 N; 148/32; 148/131
[58] Field of Search ................... 148/11.5 C, 11.5 N, 148/131, 11.5 R, 32, 34

[56] References Cited

U.S. PATENT DOCUMENTS

| 3,652,969 | 3/1972 | Willson | 148/11.5 N |
| 4,019,925 | 4/1977 | Nenno et al. | 148/11.5 N |
| 4,036,669 | 7/1977 | Brook et al. | 148/11.5 C |
| 4,067,752 | 1/1978 | Brook et al. | 148/11.5 C |

*Primary Examiner*—W. Stallard
*Attorney, Agent, or Firm*—Lyon & Lyon

[57] ABSTRACT

The effective transition temperature from martensite to austenite in a dimensionally heat-recoverable memory metal member can be temporarily raised by applying a stress and maintaining the applied stress at a temperature below the raised transition temperature so that the memory metal remains substantially in the martensitic state. When it is desired to utilize the member the stress is removed at a temperature above the original transition temperature. The applied stress is advantageously maintained by a disburdenable keeper. In an especially preferred embodiment the keeper comprises an aluminium tube positioned within a band or tube made from a brass memory alloy, the combined article being suitable as a connector for hydraulic pipes and the like.

26 Claims, 4 Drawing Figures

MEMORY METAL ARTICLE

This invention relates to memory metals and articles, especially heat-recoverable articles, made therefrom.

As is now known, certain alloys, commonly called memory alloys, can be used to make heat-recoverable articles, that is to say articles which have been deformed from an original configuration and which retain their deformed configuration until they are heated, when they recover towards their original configuration. These alloys exhibit a so-called martensitic transformation from a low temperature form to a high temperature form and it is this transformation which produces the memory effect. Amongst such alloys there may be mentioned, for example, various alloys of titanium and nickel which are described, for example in U.S. Pat. Nos. 3,174,851, 3,351,463, 3,753,700, 3,759,552, British Pat. Nos. 1,327,441, and 1,327,442 and NASA Publication SP 110, "55-Nitinol-The Alloy with a Memory, etc." (U.S. Government Printing Office, Washington, D.C. 1972). The property of heat-recoverability has not, however, been solely confined to such titanium-nickel alloys. Thus, for example, various beta-brass alloys have been demonstrated to exhibit this property in, e.g. N. Nakanishi et al., Scripta Metallurgica 5, 433–440 (Pergamon Press 1971) and such materials may be doped to lower, their transition temperatures to cryogenic regimes by known techniques. Similarly 304 stainless steels have been shown to enjoy such characteristics E. Enami et al., id, at pp. 663–68.

As mentioned above, these alloys exhibit a memory effect on passing from a low temperature, e.g. martensitic, form to a high temperature, e.g. austenitic, form. This transformation occurs over a small temperature range and, because of hysteresis, the position of the temperature range usually varies depending on whether the alloy is being heated or cooled. Thus, on heating, transformation occurs over the range $A_s - A_f$, where $A_s$ and $A_f$ are the temperatures at which formation of austenite begins and is completed, respectively, and, on cooling, transformation occurs over the range of from $M_s - M_f$, where $M_s$ and $M_f$ are the temperatures at which formation of martensite begins and is completed, respectively. The transformation from one form to the other may be followed by measuring one of a number of physical properties of the alloys, as well as from the shape change. For example, the electrical resistivity of such an alloy shows an anomaly as the transformation takes place.

For many alloys $M_s$ and $A_s$ are at approximately the same temperature, that is to say the transformation begins at about the same temperature independent of whether the alloy is being heated or cooled. However, in certain commercial applications it is desirable that $A_s$ should be significantly higher than $M_s$, for the following reason.

Many articles made from such alloys are provided to users in the deformed, i.e. heat-recoverable, shape and are thus in the low temperature martensitic state. For example, the hydraulic couplings described and claimed in British Pat. No. 1,327,441 are sold in the radially expanded shape, the customer placing them about the hydraulic pipes to be joined and allowing them to warm above the transition temperature, whereupon they shrink and form the desired connection. Because it is necessary for the couplings to remain in the austenitic state during use (for example, to avoid possible re-expansion of the couplings and loosening of the joints and also because of the superior strength properties in the austenitic state), the $M_s$ of the material must be chosen to be lower than the lowest temperature which the coupling may encounter in use. Because $A_s$ is approximately the same as $M_s$, this usually means that the couplings must be stored and supplied in a coolant such as liquid nitrogen to prevent premature conversion to austenite before use.

This is inconvenient and, for this reason, attempts have been made artificially to raise $A_s$, without a corresponding rise in $M_s$, for at least one heating cycle, so that the couplings may be stored and supplied at ambient temperature and caused to recover by heating. This increase in $A_s$ has been achieved successfully for certain alloys, especially β-brass alloys, by so-called "preconditioning" methods.

For example, in accordance with German Offenlegungsschrift No. 2,603,878, such alloys may be thermally preconditioned by the following method. The alloy is cooled from its austenite state to a temperature lower than $M_f$, it is then heated very slowly to a temperature, say $A_p$, at which it would normally exist wholly in the austenitic state, i.e. above $A_f$. However, because heating is very slow, transformation from martensite to austenite does not occur and, if the alloy is cooled again to below $M_f$ and then rapidly heated, transformation to austenite is found to begin at about $A_p$, i.e. the temperature to which it was slowly heated.

Another method of effectively raising $A_s$ for at least one heating cycle is by mechanical preconditioning, in accordance with German Offenlegungsschrift No. 2,603,911. In this method the alloy is maintained in a deformed configuration above $M_s$ for such a time that when the deforming stress is removed at least part of the induced strain is retained. When the alloy is then heated it is found that some of this retained strain is thermally recoverable and, more important, that transformation to austenite begins at a temperature $A_p$ which is significantly higher than $A_s$. In this case $A_p$ is not the same temperature as that at which the alloy was maintained in a deformed state, but generally increases as the holding time is increased.

It has also been found possible to precondition an alloy by both of the above processes so as to impart two artificially raised values of $A_s$, thereby allowing a two-stage recovery.

The above methods have proved very successful in preconditioning certain alloys and have opened up new fields of application for memory metals. However, the effects are not so great for other alloys and, in any case, preconditioning is a separate step and relatively time consuming.

Accordingly, there is still a need for a simple effective method by which memory metal articles may be stored at, say, room temperature even though their $M_s$ remains below any temperature likely to be encountered in use.

The present invention provides a method of making a connection using a device comprising a heat-recoverable memory metal member, wherein a stress is applied to the member in its heat-recoverable form so as temporarily to increase the $A_s$ temperature of the memory metal from $T_1$ to $T_2$ and, whilst maintaining a stress the article is stored at such a temperature less than $T_2$, preferably between $M_s$ and $T_2$, for example between $T_1$ and $T_2$, at such an applied stress that the memory metal substantially remains in its martensitic state (so that, were the applied stress to be removed, $A_s$ would revert substantially to $T_1$), and wherein immediately before making the connection the stress is removed at a temperature greater than $T_1$ so that the member recovers to effect connection.

The present invention also provides a method of making a heat-recoverable memory metal member which comprises applying a stress to the member in its deformed heat-recoverable state so as temporarily to increase the $A_s$ value from $T_1$ to $T_2$ and, whilst maintaining a stress, storing the article at such a temperature less than $T_2$, preferably between $M_s$ and $T_2$, for example between $T_1$ and $T_2$, and at such a maintained applied stress that the memory metal substantially remains in its martensitic state.

The applied stress is conveniently that which is used to deform the memory metal from its original configuration to its deformed heat-recoverable configuration. Thus, in a preferred embodiment the present invention provides a method of making a heat-recoverable article which comprises imparting a thermally recoverable deformation to a memory metal member at a temperature below the normal transition temperature of the metal, the applied deforming stress being also sufficient to raise the transition temperature of the memory metal above the temperature at which the article is to be stored, maintaining the applied stress and storing the article at a temperature less than the raised transition temperature, preferably at a temperature between the normal transition temperature and the raised transition temperature.

It will be appreciated, however, that the present invention provides for the application of stress to a preformed heat-recoverable article and also that the stress applied during storage may be greater or less than that used in the initial deformation, provided that, in accordance with the fundamental concept of the present invention, the raised $A_s$ value during storage is at all times greater than the temperature of storage.

In many advantageous embodiments of the present invention the memory metal member will be hollow and will be provided with at least one opening for receiving a substrate to which a connection is to be made; it may, for example, be a continuous or split band or tube. For convenience, the invention will from now on be described with reference to heat-shrinkable hollow coupling devices such as bands, rings and tubes, but it will be appreciated that the heat-recoverable memory metal member may take other forms and may also, for example, be an actuating element in a composite connecting device comprising one or more other parts.

The stress applied to such a coupling member to raise $A_s$ from $T_1$ to $T_2$ may conveniently be applied by means of a keeper, which may be resilient, positioned within the coupling and which applies the stress, for example, by its own resilience and/or by the resilience of the coupling itself. In some cases the keeper may be the mandrel which is conventionally used to deform the coupling from its original undeformed state to its deformed, heat-recoverable state. However, in preferred embodiments, it is a separate member which may be applied during or immediately after mandrel expansion and which is readily displaceable or, especially destructible or deformable.

In certain preferred embodiments, for example, the keeper may be positioned within the discontinuity of an expanded split ring or tube and, if desired, is knocked out to allow recovery. In other embodiments the keeper may be made from a fusible or heat-softenable material so that recovery can be effected by heating at a temperature above $T_1$ to weaken the keeper. In yet other embodiments the keeper may be made insufficiently strong to withstand the recovery forces generated during the transformation to austenite in which case recovery can be effected simply by heating to $T_2$ (or to whatever raised $A_s$ value is being maintained by the applied stress) or above.

Other forms of keeper, such for example as chemically degradable, e.g. soluble keepers, will be apparent to those skilled in the art. It will also be appreciated that in some cases the keeper may itself form a useful part of the connecting device, for example as a fusible solder insert or as a substrate-compatible insert of the type described and claimed in German Applications Nos. OS 2,448,160; OS 2,615,572; OS 2,615,723; OS 2,615,683 and OS 2,615,685.

The present invention is based upon the known fact that, for most alloys, $A_s$ increases with increasing stress. For example, for nickel-titanium alloys, the $A_s$ value increases by about 1° C. for every 1,000 p.s.i. applied stress. As the elastic limit of these alloys is about 70,000 p.s.i. this means that the $A_s$ value can quite readily be increased by, for example, 50° C. Thus, if the "normal" $M_s$ (and $A_s$) of such an alloy lies at $-20°$ C., it is possible in accordance with the present invention to store a heat-recoverable article made from such an alloy at room temperature at an applied stress of 50,000 p.s.i. so that its raised $A_s$ value is about $+30°$ C. Recovery can, when desired, be effected by removing the stress, i.e. displacing or destroying a keeper, whereupon $A_s$ reverts to $-20°$ C., or by heating to above $+30°$ C. so that the keeper melts or is destroyed or crushed by the recovery of the coupling.

Despite the fact that, as mentioned above, it has been known for some time that $A_s$ increases with increasing stress, it has never before been proposed to use this fact and, whilst it has been proposed, for example in British Pat. No. 1,327,441 to position a keeper within a heat-recoverable metal coupling (but not to use a readily displaceable or disposable keeper to this end), the object of such keepers was so that the couplings could be stored in their expanded form at temperatures above $A_f$ and so that when the coupling/keeper assembly was once again immersed in liquid nitrogen the coupling would expand slightly to facilitate removal of the keeper. [It should be noted that operating in accordance with British Pat. No. 1,327,441 it is necessary to reimmerse the assembly in liquid nitrogen in order once again to bring the coupling to its martensitic form before it is applied to the substrate.]

Furthermore, whilst in the mechanical preconditioning method of German OS No. 2,603,911, a memory metal member is held under stress at a temperature above $M_s$ in order to increase its $A_s$ value for the first cycle of heating, it will be noted that the $A_s$ value does not revert to its original value on removal of the restraining force. This is because the method is, to some extent, dependent upon a conversion to austenite so as to allow an isothermal and localised conversion of austenite to pseudo-elastic martensite as the memory metal member attempts to recover against the constraining stress, some of the elastic strain thereby imparted being retained when the deforming stress is removed. This retained strain is partially recoverable when the memory metal is heated to $A_p$, its temporarily increased $A_s$ value. Similarly, it will be noted that in this mechanical preconditioning method, the memory alloy is held at a temperature above $M_s$ for a considerable period of time in order to obtain the retained strain which is connected with the raised $A_s$, the $A_s$ value being increased as the length of the treatment is increased. At at least some stage in this period the memory metal is maintained under stress at a temperature greater than the raised $A_s$ value at that time (even though in some cases, that temperature may be less than the final $A_s$ value obtained by the preconditioning method. This therefore ensures an at least partial conversion to austenite, for the reasons discussed above, and in order to realise the total dimensional memory it may be necessary to cool below $M_f$ before reheating.

In accordance with the present invention, however, the $A_s$ value is immediately temporarily increased by the application of stress and at no stage during the storage period is the temperature greater than the raised $A_s$ value. Thus, the memory metal remains in its martensitic state throughout storage and no cooling step is necessary to realise the dimensional recovery. As soon as the applied stress is removed at a temperature above $T_1$, the original $A_s$ value, then recovery will occur.

Thus, whilst various heat and stress treatments of memory alloys have been proposed, none of these have utilised the novel and fundamental concept of the present invention, namely to increase normal $A_s$ by applying stress whilst at the same time keeping the alloy substantially in its martensitic form and thereby both preventing permanent or temporary loss of thermally-recoverable strain and ensuring that the alloy will recover as soon as the stress is removed at or above the normal $A_s$ temperature.

It follows that no one has before conceived the readily destructible, deformable or displaceable keepers which are advantageously used in the practice of the present invention and, in its broadest form, the present invention provides a heat-recoverable memory metal member which is held in stress in a predominantly martensitic state, i.e. below $T_2$, by a disburdenable keeper. By a "disburdenable keeper" there is herein meant one which can be removed or changed immediately before or at the onset of recovery so as to free the memory metal member from the deforming stress without the need to reduce the temperature of the keeper/memory metal member assembly to below $T_1$, $T_1$ being the $A_s$ of the memory metal of the heat-recoverable member in the absence of the applied stress.

Attention is drawn in this respect to Patent Application Ser. No. 870,183, filed today, inventors R. J. T. Clabburn and R. J. Penneck, claiming priority from British Patent Application No. 2833/77, filed 24th Jan., 1977, and to Patent Application Ser. No. 870,185, filed today, inventor M. D. Gazeley, claiming priority from British Patent Application No. 8408/77 filed 28th Feb., 1977. These applications, the disclosures of which are incorporated herein by this reference, describe in detail such disburdenable keepers and suitable materials from which they may be made.

In one especially preferred form of the present invention the disburdenable keeper is one which is strong enough to provide the applied stress during storage but is insufficiently strong to withstand the recovery forces of the memory metal member. Such a keeper may accordingly be deformed by the simple expedient of heating the article to the raised transition temperature ($T_2$). For example, such an article can be made in accordance with the teachings of British Pat. No. 1,488,393, in the form of a tubular aluminium insert acting as a disburdenable keeper positioned inside a radially heat-recoverable band or tube made from a memory metal such as a $\beta$-brass. This article may be used to connect substrates such as hydraulic pipelines.

Such an article is economically interesting because the $M_s/A_s$ difference for certain brass alloys in quite large and because they are relatively cheap. One drawback until now has been that, despite the relatively large temperature difference between $M_s$ and $A_s$, it has been necessary, in order to keep $M_s$ below the minimum temperature likely to be encountered in operation, to use alloys for which $A_s$ is only just above ambient temperature. This has sometimes led to premature recovery of the articles during storage, rendering them useless. In accordance with the present invention, however, it is possible to raise $A_s$ sufficiently to remove this problem without at the same time raising $M_s$ to an unacceptable level.

Figure 2:
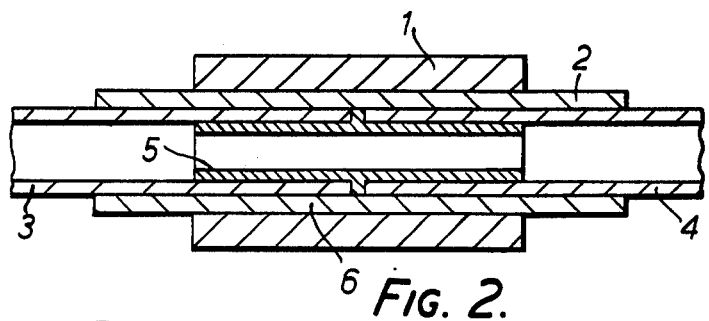

One preferred form of article in accordance with the present invention will now be described in more detail by way of example only with reference to the accompanying drawings, in which FIG. 1 illustrates a connector, and FIG. 2 illustrates the use of the connector to join two pipes.

Referring now to the drawings, there is shown a connector comprising a radially heat-shrinkable tube 1 made from a memory metal positioned about an insert sleeve 2 which acts as a keeper to maintain an applied stress on the tube 1. In a preferred embodiment the tube 1 is made from a brass alloy and the insert sleeve 2 is made from a metal such as aluminium. In accordance with the present invention the insert sleeve 2 is sufficiently strong that it maintains an applied stress on the tube 1 so long as the tube 1 remains in the martensitic state, but, on the other hand, is not strong enough to resist the recovery forces of the tube 1 when the temperature is raised to above $T_2$.

As shown in FIG. 2, therefore, the device may be used as a composite connecting device in accordance with British Pat. No. 1,488,393. In the arrangement shown, two pipes 3 and 4 are brought into abutting relationship by locating them around a spacer member 5 which is provided with an annular collar 6 against which the ends of the pipes 3 and 4 abut. This assembly is positioned inside the connector shown in FIG. 1 and, when the temperature is raised to $T_2$ or above, the memory metal tube 1 shrinks radially and forces the insert sleeve 2 into firm connection with both pipes.

Of course, it will be appreciated that, in accordance with British Pat. No. 1,488,393, the insert sleeve 2 may be made from a gall-prone material or another material which is compatible with the material of the pipes 3 and 4. Alternatively, it may be provided on its inner surface with teeth or other projecting members which bite into the pipes 3 and 4 on recovery.

In an especially advantageous embodiment, the memory metal tube 1 is made from a preconditioned brass alloy which has an $M_s$ well below room temperature, for example, as low as $-40°$ C. With such an alloy the normal preconditioned $A_s$ will be at, or slightly above, ambient temperature. In the absence of the use of the present invention there would be a danger that the device shown in FIG. 1 would become sufficiently warm as to cause temperature recovery during storage. However, because of the applied stress maintained by the insert sleeve 2, the $A_s$ may be raised to a level which is sufficiently high to avoid this danger.

The connector may be made by various methods. For example, the heat-recoverable tube 1 may be deformed and a stress in accordance with the present invention may be applied by a mandrel, which is subsequently removed and replaced by the keeper sleeve 2. Alternatively, the heat-recoverable tube 1 and the insert sleeve 2 may, in some cases, be deformed simultaneously to produce the connector shown in FIG. 1.

The present invention therefore provides a novel and important method of transiently increasing the recovery temperature of heat-recoverable memory metal articles by a treatment in which a stress is applied to increase the $A_s$ value of the memory metal and the stress is maintained at a temperature below the increased $A_s$ so that there is no attempt by the article to recover against the applied stress. When the heat-recoverable article is to be used the applied stress is removed, whereupon the $A_s$ reverts substantially to $T_1$.

Whilst the present invention is especially advantageously applied to nickel-titanium and brass alloys, as discussed above, it will also be suitable for many other memory alloys, especially those in which $A_s$ is increased significantly by applied stress. Suitable stresses and temperatures to be used for such alloys in accordance with the present invention will, determinable by routine experiment using, for example, the electrical, crystallographic and other methods known to those skilled in the art.

Figure 3:
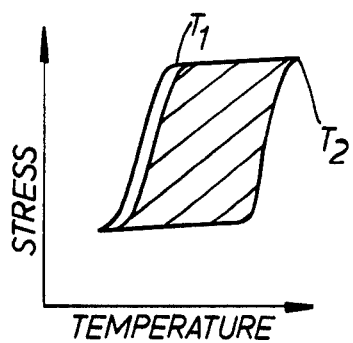
Figure 4:
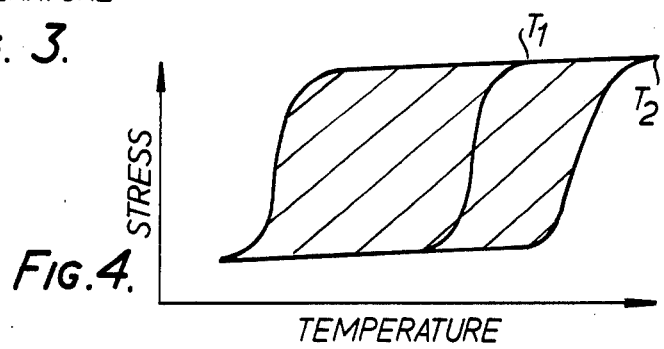

Finally, in FIGS. 3 and 4 there are shown typical hysteresis for a nickel titanium alloy and a preconditioned brass alloy, respectively.

As can be seen from FIG. 3, the hysteresis loop for a nickel titanium alloy is rather narrow and, therefore, the articles in accordance with the present invention will in general be stored at a temperature within the shaded range between $T_1$ and $T_2$.

On the other hand, as is shown in FIG. 4, the original hysteresis loop for a preconditioned brass alloy such, for example, as a quaternary copper/aluminium/zinc/manganese alloy of the type described and claimed in Belgian Pat. No. 838,197 is relatively wide and therefore the articles of the present invention may, if desired, be stored at a temperature within the shaded area, i.e. at a temperature lower than $T_1$.

Other variations and modifications in accordance with the present invention will be apparent to those skilled in the art.

1. A method of making a heat-recoverable memory metal member which comprises applying a stress to the member in its deformed dimensionally heat-unstable state so as temporarily to increase the $A_s$ value of the memory metal from $T_1$ to $T_2$, and whilst maintaining an applied stress, storing the article at such a temperature less than $T_2$ and at such a maintained applied stress that the memory metal remains substantially in the martensitic state.

2. A method as claimed in claim 1, wherein the applied stress is applied at the same time as the stress applied to deform the memory metal member to its dimensionally heat-unstable state.

3. A method as claimed in claim 1, wherein the applied stress is applied after the memory metal member has been deformed to its dimensionally heat-unstable state.

4. A method as claimed in claim 1, wherein a disburdenable keeper is used to provide the applied stress.

5. A method as claimed in claim 4, wherein the keeper is destructible or deformable.

6. A method as claimed in claim 5, wherein the keeper is made from a fusible material.

7. A method as claimed in claim 5, wherein the keeper is made from a chemically degradable material.

8. A method as claimed in claim 5, wherein the keeper is insufficiently strong to withstand the recovery forces generated on heating the memory metal member to $T_2$.

9. A method as claimed in claim 1, wherein the memory metal member is a radially expanded band or tube.

10. A method as claimed in claim 9, wherein a keeper in the form of a band or tube is positioned inside the memory metal member.

11. A method as claimed in claim 1, wherein the memory metal member is a hollow member having a discontinuity in its cross-section in the plane of recovery.

12. A method as claimed in claim 11, wherein a keeper is positioned inside said discontinuity.

13. A method as claimed in claim 1, wherein the memory metal member is stored at a temperature between $M_s$ and $T_2$.

14. A method as claimed in claim 1, wherein the memory metal member is stored at a temperature between $T_1$ and $T_2$.

15. A method of making a heat-recoverable article which comprises imparting a thermally recoverable deformation to a memory metal member at a temperature below the normal transition temperature of the metal, the applied deforming stress also being sufficient to raise the transition temperature of the memory metal above the temperature at which the article is to be stored, maintaining the applied stress and storing the article at a temperature less than the raised transition temperature.

16. A method as claimed in claim 15, wherein the applied stress is maintained using a disburdenable keeper.

17. A method as claimed in claim 16, wherein the keeper is insufficiently strong to withstand the recovery forces generated on heating the article to the raised transition temperature.

18. A method as claimed in claim 17, wherein the memory metal member is a radially recoverable band or tube and the keeper is a deformable band or tube positioned inside it.

19. A method as claimed in claim 15, wherein the memory metal is a nickel-titanium alloy.

20. A method as claimed in claim 15, wherein the memory metal is a brass.

21. A heat-recoverable article which comprises a dimensionally heat-recoverable memory metal member held in stress in a predominantly martensitic state with a raised transition temperature by a disburdenable keeper.

22. A heat-recoverable article as claimed in claim 21, wherein the memory metal member is a band or tube made from a brass and the keeper is a band or tube of aluminium positioned within it.

23. A method of making a connection using a device comprising a memory metal member, wherein a stress is applied to the member in its dimensionally heat-recoverable form so as temporarily to increase the $A_s$ temperature of the memory metal from $T_1$ to $T_2$ and, whilst maintaining a stress the article is stored at a temperature less than $T_2$, the memory metal remaining substantially in the martensitic state during storage, and wherein immediately before connection the stress is removed at a temperature greater than $T_1$ so that the member recovers to make the connection.

24. A method as claimed in claim 23, wherein the stress is applied by a disburdenable keeper.

25. A method as claimed in claim 24, wherein the stress is removed by heating the article to $T_2$ so that the memory metal member recovers and deforms the keeper.

26. A method as claimed in claim 23, wherein the connection is made between two generally tubular substrates, the memory metal being in the form of a band or tube sized to fit about said substrates.

* * * * *

UNITED STATES PATENT AND TRADEMARK OFFICE
CERTIFICATE OF CORRECTION

PATENT NO. : 4149911
DATED : 4/17/79
INVENTOR(S) : Clabburn, Robin J. T.

It is certified that error appears in the above–identified patent and that said Letters Patent are hereby corrected as shown below:

Page 1, Column 1, Lines 2 - 3,

Change "Atherton, England" to

-- Atherton, California --

Signed and Sealed this

Eleventh Day of December 1979

[SEAL]

Attest:

Attesting Officer

SIDNEY A. DIAMOND

*Commissioner of Patents and Trademarks*